United States Patent
Davisson et al.

(10) Patent No.: US 7,547,463 B2
(45) Date of Patent: Jun. 16, 2009

(54) METHOD OF IMPARTING NON-STICK PROPERTY TO METAL SURFACE

(75) Inventors: Thomas L. Davisson, Chardon, OH (US); Sadashiv Nadkarni, Bedford, MA (US)

(73) Assignee: Novelis Inc., Toronto (CA)

( * ) Notice: Subject to any disclaimer, the term of this patent is extended or adjusted under 35 U.S.C. 154(b) by 385 days.

(21) Appl. No.: 11/471,171

(22) Filed: Jun. 19, 2006

(65) Prior Publication Data
US 2007/0009666 A1    Jan. 11, 2007

Related U.S. Application Data

(60) Provisional application No. 60/697,411, filed on Jul. 7, 2005.

(51) Int. Cl.
*B05D 1/00* (2006.01)

(52) U.S. Cl. ............ 427/209; 427/178; 427/378; 427/388; 427/389; 428/447; 428/450; 428/689; 524/323; 524/267; 524/736; 524/738; 524/438

(58) Field of Classification Search ............ 427/178; 428/447; 524/323
See application file for complete search history.

(56) References Cited

U.S. PATENT DOCUMENTS

| | | | |
|---|---|---|---|
| 2,978,098 A | 4/1961 | Post | |
| 3,960,810 A | 6/1976 | Chandra et al. | |
| 6,103,310 A | 8/2000 | Popadenec et al. | |
| 6,372,290 B1 | 4/2002 | Berkenkoetter et al. | |
| 6,423,417 B1 | 7/2002 | Robbins | |
| 6,544,658 B2 * | 4/2003 | Robbins | 428/458 |
| 2003/0114937 A1 * | 6/2003 | Leatherbury et al. | 623/23.72 |

FOREIGN PATENT DOCUMENTS

| | | |
|---|---|---|
| GB | 1448985 | 9/1976 |
| JP | 01-170431 | 7/1989 |
| WO | WO 01/89719 A2 | 11/2001 |

OTHER PUBLICATIONS

Z. Bakenov et al. Solid State Ionics vol. 176, (2005), pp. 1027-1034.*

* cited by examiner

*Primary Examiner*—Nadine Norton
*Assistant Examiner*—Maki Angadi
(74) *Attorney, Agent, or Firm*—Cooper & Dunham LLP

(57) ABSTRACT

A method of imparting a non-stick coating to a surface of an aluminum foil sheet, and the resulting foil sheet. The method involves coating at least part (preferably at least 40%) of an area of a surface of a metal sheet article (preferably an aluminum foil sheet) with a substantially solvent-free silicone oil at an average coating application rate in a range of 1.5 to 10 mg/ft$^2$ of the coated surface area. The coated sheet article is then preferably coiled. The coated sheet article is then heated in the presence of air or oxygen at a temperature of 250° C. or higher for a period of time of at least 10 minutes. The treated surface is both non-stick and food-friendly.

15 Claims, 1 Drawing Sheet

METHOD OF IMPARTING NON-STICK PROPERTY TO METAL SURFACE

CROSS-REFERENCE TO RELATED APPLICATIONS

This application claims the priority right of our prior co-pending provisional application Ser. No. 60/697,411 filed Jul. 7, 2005.

BACKGROUND OF THE INVENTION

I. Field of the Invention

This invention relates to methods of imparting non-stick properties to metal surfaces, particularly the surfaces of metal foils and sheets, and to the resulting non-stick products. More particularly, although not necessarily exclusively, the invention relates to methods of imparting non-stick properties to foils and sheets made of aluminum and aluminum alloys.

II. Background Art

Aluminum foil and sheet is used widely in packaging and food preparation applications. Non-stick properties are very desirable for such applications and foils or sheets having such properties are commercially available. For example, a foil of this type is sold under the brand name "Release" by Alcoa corporation, and this foil is produced by coating a hard metal foil with a suspension of a thermosetting polymer containing siloxane and a solvent, and then partially curing the polymer in an oven at a temperature sufficient to remove the solvent completely. The polymer becomes solid, thereby trapping the siloxane within the polymer (see U.S. Pat. No. 6,423,417 to Robbins which issued on Jul. 23, 2002). The partially-cured coated foil is then annealed to render the foil soft, to fully cure the polymer and to obtain "dead-fold" characteristics (the ability to be folded without spring-back). This method is expensive because the coating can be applied only at low speed due to the need to partially cure the polymer. Furthermore, two heat treatments are required, and the suspensions used as the initial coatings are expensive.

U.S. Pat. No. 2,978,098 which issued to Post on Apr. 4, 1961 describes a method of applying a silicone oil coating to aluminum foil. A foil in coil form is immersed in a solution of the oil in a volatile solvent, then removed from the solution and dried.

There is a need for an improved method of imparting a non-stick surface to aluminum foil, for example for greater economy and ease of preparation.

SUMMARY OF THE INVENTION

According to one aspect of the invention, there is provided a method of imparting a non-stick property to a surface of a metal sheet (preferably a foil of aluminum or aluminum alloy). The method involves coating at least part (preferably at least 40%) of the surface area of a metal sheet with a silicone oil (preferably substantially solvent-free) at a coating application rate in a range of 1.5 to 10 mg/ft$^2$ (preferably 2 to less than 6 mg/ft$^2$) of the coated surface area. The coated sheet is then heated (preferably after coiling into a tight coil) in the presence of oxygen at a temperature of 250° C. or higher for a period of time of at least 10 minutes. Generally, the heating temperature is kept below about 400° C. to avoid decomposition of the silicone (and thus loss of non-stick properties). The heating step not only dries and solidifies the silicone coating, but also heat-treats the sheet article (if desired) to cause annealing and to impart "dead-fold" characteristics. For annealing the sheet, the temperature is generally kept within the range of 270 to 350° C. However, sometimes partially annealed foil is desirable when harder or stronger sheet is required and the time of the heat treatment can then be appropriately limited. The duration of the heat treatment can thus be chosen according to the metal properties desired but is often less than 2 hours (e.g. around 1 hour).

The heating step is preferably carried out in air as the source of oxygen, but the heating could be carried out in other oxygen-containing atmospheres, if desired. Even when the sheet is coiled, there is still some space between the wraps or windings and this is adequate for oxygen ingress. This ingress may be assisted by directing a stream of hot air (or other oxygen-containing gas) onto the coils to ensure greater gas dispersion throughout the coil.

The invention also relates to non-stick, "food-friendly" (i.e. non-contaminating) metal foil sheet provided with a non-stick surface produced by the above method. The non-stick properties are imparted to the surface via the coating produced by the above method that is usually strongly-bonded to the metal surface.

The invention is used primarily for the treatment of aluminum sheet articles and can be applied to any aluminum alloy, although alloys conventionally intended for use with foodstuffs are preferred. The method may also be used with other metals, e.g. steel or other ferrous metals.

Both surfaces of the sheet may be treated in accordance with the invention, if desired, but normally the treatment of just one surface is sufficient and desirable.

It is an advantage of the present invention that the silicone oil can be applied rapidly at low loadings, and the curing step is combined with the annealing step for the metal. Coating speeds of up to 2,000 feet per minute can be achieved using the method of the present invention and the resulting sheet may be used for food applications without further surface treatment, although the sheet initially formed in large coils is generally re-packaged into small rolls, normally of 25 to 500 feet, for greater convenience.

The term "sheet" as used herein is intended to mean any elongated laminar product of large surface area and relatively small thickness, but the invention is primarily concerned with the treatment of metal foil, e.g. a sheet having a thickness of 0.008 inches or less that can readily be bent and folded by hand, e.g. foil used for wrapping or covering food, or for making inexpensive and disposable food containers or covers. Generally the sheet is treated in accordance with the invention in the form in which it is received from the mill without any prior surface preparation.

The meaning of the term "non-stick surface" will be understood by persons skilled in the art, but a practical definition is that foods containing starches, sugars or proteins do not adhere strongly to such surfaces when placed in contact therewith and exposed to cooking temperatures (up to 450° F.).

The term "silicone oil or fluid" as used herein refers to a liquid form of silicone, i.e. a semi-inorganic polymer based on the structural unit $R_2SiO$, where R is an organic group. Di-methyl siloxane having a viscosity similar to that of water (around 1 cp) is especially preferred, but other classes of silicone polymer may be used, e.g. dimethy polysiloxanes, polyester-modified methyl phenyl polysiloxanes and hydroxyl functional silicone resins. Suitable silicone oils and fluids for use in the present invention are manufactured by Dow Corning and Cadillac Oil Co of the United States of America. Generally, the presence of polymerization catalysts in the silicone oil or resin is to be avoided as catalysts can contaminate the sheet and thus make the product unsuitable for food applications. Other additives are generally avoided too, for example silicone release agents, antioxidants and the like. However, if desired to reduce the viscosity of a silicone oil or fluid, a volatile, non-toxic solvent may be added, e.g. isopropyl alcohol or ketone solvents.

The term "substantially solvent-free" as used herein means that no solvent is added to the commercial grade of a pure silicone oil product. The silicone oil is preferably completely solvent free (referred to simply as "solvent free"). In such cases, the silicone resin is thus essentially pure and contains only the impurities normally present in a commercial-grade product.

DETAILED DESCRIPTION OF THE INVENTION

Figure 1:
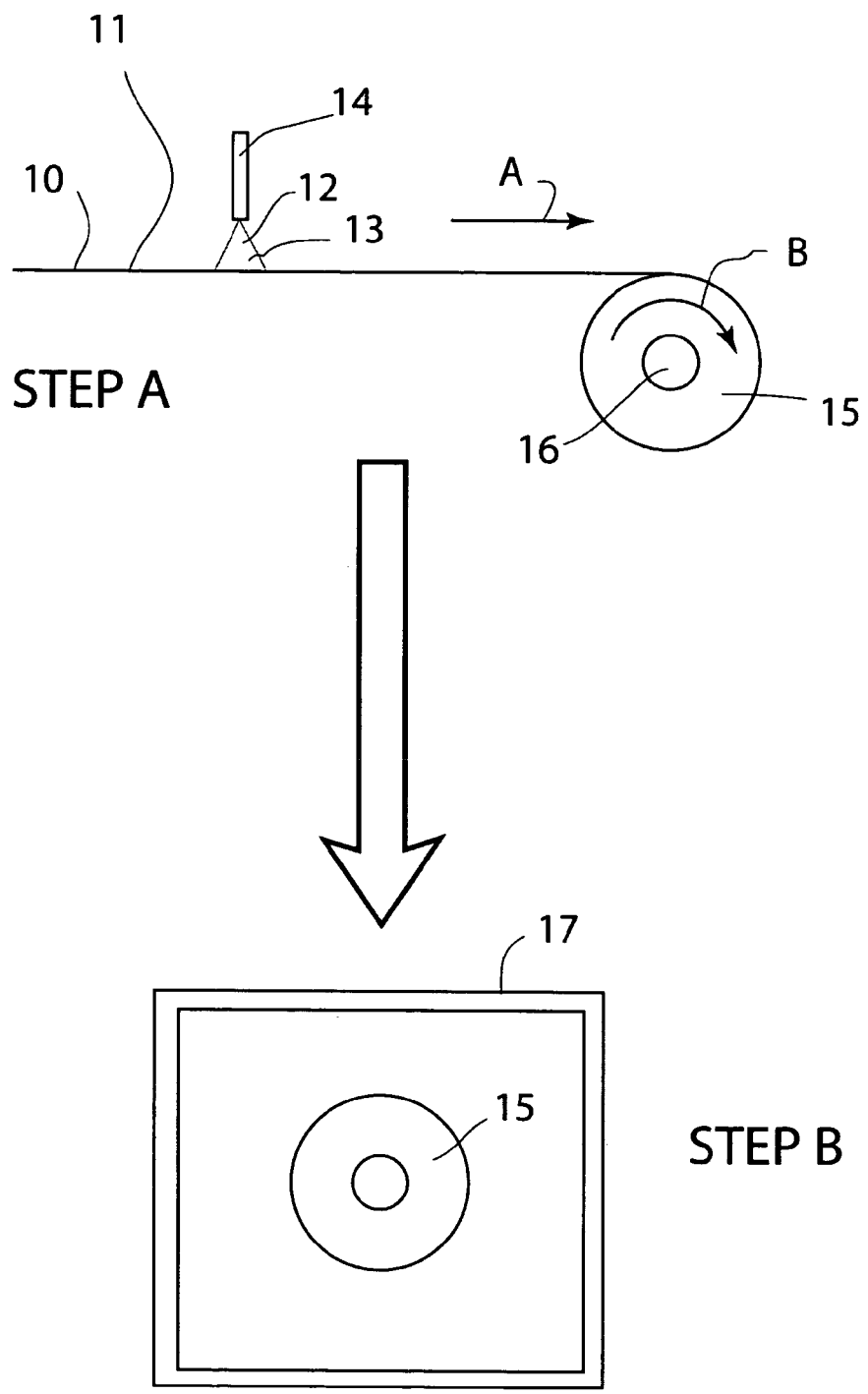
FIG. 1 is a schematic diagram showing steps in a preferred method according to one form of the present invention.

It will be appreciated that the term "aluminum" as used herein is intended to include alloys of aluminum, particularly those used for the formation of converter foil, as well as pure aluminum. Furthermore, the term "foil" is used in the description below, but the present invention may also be used with sheet articles of greater thickness, although the invention is particularly applicable to the coating of foils.

As shown schematically in FIG. 1 of the accompanying drawings, a preferred form of the present invention includes two steps shown as STEP A and STEP B. In STEP A, a foil sheet 10 moving in the direction of arrow A is coated on one side 11 (although two-sided coating would be possible) with a commercially-pure grade of silicone oil 12 in the form of a spray 13 emanating from a spray coater 14 (preferably an ultrasonic spray coater) that avoids contact of the foil with any solid object that could damage or mar the foil. The spray is applied at ambient temperature and the coating speed may be quite high, e.g. up to 2000 ft. per minute. Alternative conventional coating methods may be employed, but are less preferably, e.g. wiping, brushing or flowing, etc.

The silicone oil is preferably a polymer of dimethylsiloxane units and can be obtained commercially, e.g the product sold under the trademark CADCO 03-B-956-50 by Cadillac Oil Co of Hamtramck, Mich., USA.

After coating, the foil sheet is coiled to form a coil 15 by tightly winding the sheet on a roller 16 rotating in the direction of arrow B.

In this coating procedure, at least 40% and more preferably at least 60% or up to 100% of the surface area of the foil sheet (on one or both sides) is coated with the silicone oil. The oil is applied at an average coating rate (or loading) at less than 10 mg/ft$^2$ of the coated surface, more preferably less than 6 mg/ft$^2$. At coating rates above about 10 mg/ft$^2$, the silicone oil reacts in part to form silica, which may form local bonds between the foil layers and cause the layers in the coil to stick together so that the foil tears when the coil is unwound. The minimum average coating rate is around 1.5 mg/ft$^2$ (more preferably 2 mg/ft$^2$) as the non-stick coating may not form in all cases at lower coating rates. Such low coating rates also have the advantage that excess does not emerge at the ends of the coil, thereby avoiding contamination.

The silicone oil is preferably solvent-free and undiluted. It is also preferably free of any kind of catalyst as the product is likely to come into contact with food and catalysts often have some degree of toxicity.

In STEP B, the coil 15 is transferred to a heating furnace 17 and is heated in the presence of air or oxygen to a temperature of 250° C. or higher for a period of at least 10 minutes. At temperatures below about 250° C., a non-stick coating does not form in all cases. While no particular upper limit need be specified for the heating step, preferably it is no higher than about 400° C. to avoid decomposition of the silicone, and in practice there is no need to use temperatures higher than about 350° C. The duration of the heating step should be sufficient to convert the silicone oil to a dry cured form and to impart at desired degree of temper to the metal foil.

After the heat treatment, the coil is allowed to cool naturally in ambient air, or is cooled at faster than the natural cooling rate, e.g. in a moving current of cool air or other gas. The foil sheet can then be used directly or unwound and packaged for subsequent sale and use. The foil has a hard dry coating that has desirable non-stick properties. The coating silicone oil appears to polymerize on the aluminum surface and to form an impermeable layer rendering the foil non-stick.

Without wishing to be limited to any particular theory of operation, it is believed that the applied silicone oil is at least partially vaporized from the foil surface during the heating step. Because the foil is in coil form, the vapor cannot easily escape and it redistributes itself uniformly over the entire foil surface. The presence of air or oxygen causes a polymerization reaction to take place within the silicone oil that causes the deposition of a uniform non-stick coating over the entire foil surface. Sufficient oxygen is present, even in a tightly wound coil. If the oxygen is absent, e.g. if the heating is carried out in another gas such as nitrogen, the polymerization does not occur, and a non-stick coating does not form.

The invention is illustrated in more detail by the following Examples, which are not intended to be limiting.

EXAMPLES

Several Examples according to the invention or provided for comparison are shown in Table 1 below. All Examples are of foil annealed in coil form (12 inch and 6 inch diameter) in air. This risks an additional potential problem as sticking of wraps has to be avoided. However, the Examples showing sticking of wraps could be modified to avoid coiling when carrying out the heat treatment, thereby still giving useful products.

TABLE 1

| Example No. | Silicone Oil Application (Di-methyl Siloxane) (mg/ft$^2$) | Annealing Temp (° C., maintained for 1 hour) | Comment |
| --- | --- | --- | --- |
| 1 | 0 | 290 | food sticks, wraps free, product unacceptable |
| 2 | 0.5 | 290 | food sticks, wraps free, product unacceptable |
| 3 | 1.5 | 290 | non-stick, wraps free |
| 4 | 3 | 290 | non-stick, wraps free |
| 5 | 6 | 290 | non-stick, slight sticking of wraps, but acceptable |
| 6 | 8 | 290 | non-stick, wraps stuck, but product acceptable |
| 7 | 16 | 290 | non-stick, heavy wrap sticking, product unacceptable |
| 8 | 3 | 230 | food sticks, wraps free, but product acceptable |
| 9 | 1.5 | 260 | non-stick, wraps free |
| 10 | 3 | 270 | non-stick, wraps free |

Examples 3, 4 and 5 above were repeated in an atmosphere of pure nitrogen. The result was that the foil did not stick together, but the food stuck to the foil, so the product was unacceptable. The same result was obtained when non-annealed foil was used.

The invention claimed is:

1. A method of imparting a non-stick coating to a surface of a metal sheet, which method consists of:
    coating an area of at least 40% of a surface of a metal sheet with a silicone oil at an average coating application rate in a range of 1.5 to 10 mg/ft$^2$ of said coated surface area; then coiling said metal sheet; and then
    heating the coiled sheet in the presence of oxygen at a temperature of 250° C. or higher for a period of time of at least 10 minutes.

2. The method of claim 1, wherein said coating application rate is in a range of 2.0 to 10 mg/ft$^2$.

3. The method of claim 1, wherein said coating application rate is in a range of 2.0 to less than 6 mg/ft$^2$.

4. The method of claim 1, wherein said heating is carried out at a temperature no higher than 400° C.

5. The method of claim 1, wherein the heating is carried out at a temperature in the range of 270 to 350° C.

6. The method of claim 1, wherein the heating is carried out in air as a source of said oxygen.

7. The method of claim 1, wherein the sheet is made of aluminum or an alloy of aluminum.

8. The method of claim 7, wherein the sheet is a foil.

9. The method of claim 1, wherein the silicone is di-methyl siloxane.

10. The method of claim 1, wherein the silicone oil is substantially solvent-free.

11. The method of claim 1, wherein the silicone oil is dissolved in a solvent.

12. The method of claim 11, wherein the solvent is selected from the group consisting of isopropyl alcohol and ketone solvents.

13. The method of claim 1, wherein the silicone oil is applied by a method that avoids contact of any object with the sheet other than the silicone oil.

14. The method of claim 1, wherein the silicone oil is applied by ultrasonic spraying.

15. The method of claim 10, wherein said sheet has two opposed surfaces and areas of both said surfaces are coated with said substantially solvent-free silicone oil at an average coating application rate in a range of 1.5 to 10 mg/ft$^2$ of said coated surface area.

* * * * *